(12) United States Patent
Lee

(10) Patent No.: US 12,337,858 B2
(45) Date of Patent: Jun. 24, 2025

(54) SYSTEM AND METHOD FOR PROVIDING CONNECTED SERVICE

(71) Applicants: Hyundai Motor Company, Seoul (KR); Kia Corporation, Seoul (KR)

(72) Inventor: Tae Ho Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 311 days.

(21) Appl. No.: 17/404,672

(22) Filed: Aug. 17, 2021

(65) Prior Publication Data
US 2022/0258753 A1 Aug. 18, 2022

(30) Foreign Application Priority Data
Feb. 17, 2021 (KR) .................. 10-2021-0021376

(51) Int. Cl.
*B60W 50/08* (2020.01)
*B60W 50/00* (2006.01)
*G06F 16/23* (2019.01)
*H04W 4/40* (2018.01)

(52) U.S. Cl.
CPC ......... *B60W 50/08* (2013.01); *G06F 16/2358* (2019.01); *G06F 16/2365* (2019.01); *H04W 4/40* (2018.02); *B60W 2050/0005* (2013.01); *B60W 2556/20* (2020.02); *B60W 2556/45* (2020.02)

(58) Field of Classification Search
CPC ............. B60W 50/08; B60W 2556/20; B60W 2556/45; B60W 2050/0005; H04W 4/40; G06F 16/2358; G06F 16/2365
See application file for complete search history.

(56) References Cited

U.S. PATENT DOCUMENTS

| 2011/0215900 | A1* | 9/2011 | Corradino | H04M 1/72463 340/5.52 |
| 2014/0025746 | A1* | 1/2014 | Rhee | H04L 67/306 709/204 |
| 2016/0046300 | A1* | 2/2016 | Wingfield | G06Q 30/0645 701/48 |
| 2019/0130718 | A1* | 5/2019 | Alpert | G08B 19/00 |
| 2020/0130609 | A1* | 4/2020 | Ibitoye | B60R 19/023 |
| 2020/0133261 | A1* | 4/2020 | Tao | G06F 21/32 |
| 2020/0275241 | A1* | 8/2020 | Levy | H04W 4/80 |
| 2022/0417359 | A1* | 12/2022 | Tokuyama | H04Q 9/00 |

* cited by examiner

*Primary Examiner* — Thomas E Worden
*Assistant Examiner* — Jay Khandpur
(74) *Attorney, Agent, or Firm* — Fox Rothschild LLP

(57) ABSTRACT

A system for providing a connected service includes a portable device and a vehicle terminal. User information is input into the portable device and the vehicle terminal, and a server receives the user information from one or more of the portable device and the terminal and determines whether the received user information is recognizable. The server further determines whether to store the user information as a new data set based on the number of times the user information is received in response to determining that the user information is unrecognizable. The system reduces inconvenience since a data set including attributes of setting functions is not updated every time for a new vehicle model, and allows a user to conveniently use the connected service when necessary since an occurrence of an error during an update process is prevented.

10 Claims, 8 Drawing Sheets

SYSTEM AND METHOD FOR PROVIDING CONNECTED SERVICE

CROSS-REFERENCE TO RELATED APPLICATION

This application claims the benefit of priority to Korean Patent Application No. 10-2021-0021376, filed on Feb. 17, 2021, the entire contents of which are incorporated herein by reference.

TECHNICAL FIELD

The present disclosure relates to a system and a method for providing a connected service.

BACKGROUND

A connected service may provide a more comfortable and smart vehicle environment to a vehicle user by operating a connected vehicle using a portable device. Specifically, the connected service may transmit, for each user, setting information input to the portable device by the user to a server, cause the server to back up the setting information, and download the information backed up on the server to a vehicle, thereby allowing the user to use a setting function input to the portable device only by boarding the vehicle without any additional input. As an example, vehicle window opening/closing control, screen brightness control, volume control, and the like may be performed through the connected service.

In a connected vehicle of a newer vehicle model, attributes of a setting function compared to a setting function previously stored in the server are changed. In particular, a version of the server must be updated with a data set that may include attributes of the setting functions of an existing vehicle model and the new vehicle model. Therefore, there is an inconvenience of having to update the server to use the connected service whenever the new vehicle model is released, and it is difficult to use the connected service when necessary when an error occurs during an update process.

SUMMARY

The present disclosure has been made to solve the above-mentioned problems occurring in the prior art while advantages achieved by the prior art are maintained intact. An aspect of the present disclosure provides a system and a method for providing a connected service that may more easily recognize a setting value without updating a data set including attributes of a setting function of a new vehicle model every time.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for providing a connected service may include a portable device and a vehicle terminal. In particular, user information may be input into the portable device and the vehicle terminal, and a server that receives the user information from one or more of the portable device and the terminal, determines whether the received user information is recognizable, and determines whether to store the user information as a new data set based on the number of times the user information is received in response to determining that the user information is unrecognizable.

In one implementation, the user information may include vehicle setting values and attribute information linked to the vehicle setting values. The attribute information may include vehicle setting functions and key IDs respectively matched to the vehicle setting functions. The server may be configured to determine whether the number of times unrecognizable user information is received exceeds a predetermined number of times in response to determining that the received user information is unrecognizable. The server may be configured to determine to store the user information as the new data set in response to determining that the number of times the unrecognizable user information is received exceeds the predetermined number of times.

In addition, the server may be configured to inform the one or more of the portable device and the vehicle terminal that the new data set is stored when the user information is stored as the new data set. The portable device and the vehicle terminal may be configured to transmit the user information to the server after being informed that the new data set is stored in the server. In one implementation, the server may be configured to recognize the user information received from the one or more of the portable device and the vehicle terminal based on the information stored in the server. The vehicle terminal may be configured to receive vehicle setting values recognized from the server, and set a vehicle with the received vehicle setting values.

According to another aspect of the present disclosure, a method for providing a connected service may include inputting user information from one or more of a portable device and a vehicle terminal, receiving, by a server, the user information from the one or more of the portable device and the terminal, and determining whether the received user information is recognizable, and determining whether to store the user information as a new data set based on the number of times the user information is received in response to determining that the user information is unrecognizable.

The user information may include vehicle setting values and attribute information linked to the vehicle setting values. The attribute information may include vehicle setting functions and key IDs respectively matched to the vehicle setting functions. In one implementation, the method may further include determining whether the number of times unrecognizable user information is received exceeds a predetermined number of times in response to determining that the received user information is unrecognizable. In addition, the method may further include determining to store the user information as the new data set in response to determining that the number of times the unrecognizable user information is received exceeds the predetermined number of times.

The method may further include informing the one or more of the portable device and the vehicle terminal that the new data set is stored when the user information is stored as the new data set. In addition, the method may include transmitting the user information to the server after being informed that the new data set is stored in the server. The method may further include recognizing the user information received from the one or more of the portable device and the vehicle terminal based on the information stored in the server. In addition, the method may include receiving, by the vehicle terminal, vehicle setting values recognized from the server, and setting a vehicle with the received vehicle setting values.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
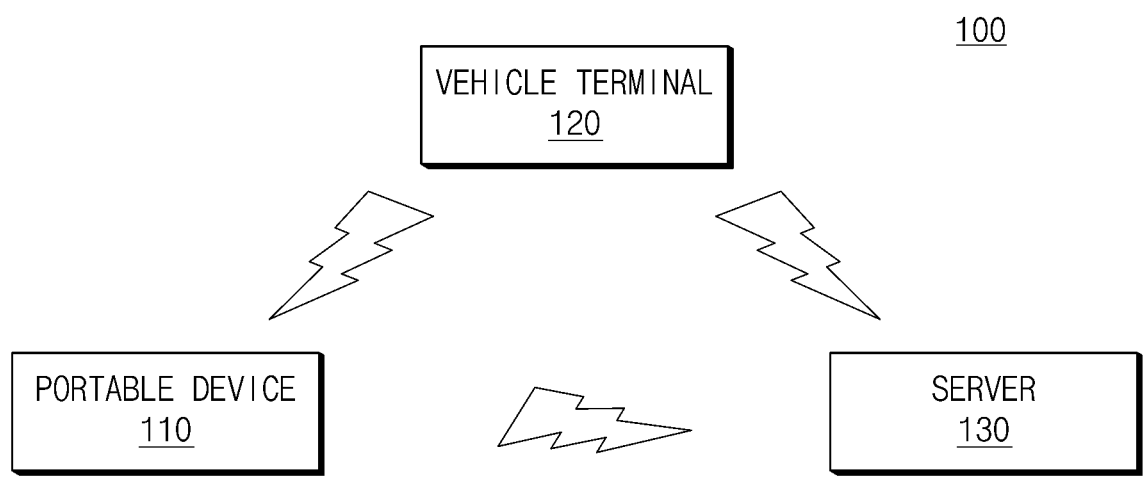
FIG. 1 is a diagram illustrating a configuration of a connected service providing system according to an exemplary embodiment of the present disclosure.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in networked coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a connected service providing system according to an exemplary embodiment of the present disclosure. As shown in FIG. 1, a connected service providing system 100 according to an exemplary embodiment of the present disclosure may include a portable device 110, a vehicle terminal 120, and a server 130.

Figure 2:
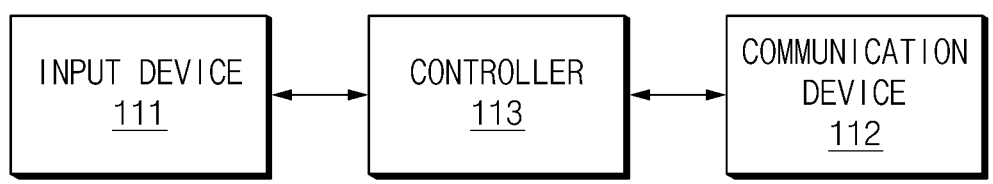
FIG. 2 is a diagram illustrating a configuration of a portable device according to an exemplary embodiment of the present disclosure.
Figure 3:
FIG. 3 is a diagram illustrating a configuration of a vehicle terminal according to an exemplary embodiment of the present disclosure.

The portable device 110 and the vehicle terminal 120 may be configured to receive user information. In this connection, the user information may include vehicle setting values input to control a vehicle model selected by a user. The vehicle setting values input by the user may be linked with attribute information including vehicle setting functions (e.g., electronic device information and a settable range), a key ID for each vehicle setting function, and the like. FIGS. 2 and 3 will be respectively referred to for detailed descriptions of the portable device 110 and the vehicle terminal 120.

Figure 4:
FIG. 4 is a diagram illustrating a configuration of a server according to an exemplary embodiment of the present disclosure.

The server 130 may be configured to receive the user information from one or more of the portable device 110 and the vehicle terminal 120, and determine whether the received user information is recognizable. In addition, in response to determining that the received user information is unrecognizable, the server 130 may be configured to determine whether to store the user information as a new data set based on the number of times the user information is received. FIG. 4 will be referred to for amore detailed description.

FIG. 2 is a diagram illustrating a configuration of a portable device according to an exemplary embodiment of the present disclosure. As shown in FIG. 2, the portable device 110 according to an exemplary embodiment of the present disclosure may include an input device 111, a communication device 112, and a controller 113.

The input device 111 may be configured to receive an input signal corresponding to a manipulation, an operation, or a voice of the user. According to an exemplary embodiment, the input device 111 may be configured to receive the user information. The user information may include the vehicle setting values input to control the vehicle model selected by the user. The vehicle setting value input by the user may be linked with the attribute information including the vehicle setting functions (e.g., the electronic device information and the settable range), the key ID for each vehicle setting function, and the like. As an example, in a case of a 2018 vehicle model "A", the input device 111 may be configured to receive a volume of a level 10 and a screen brightness of a level 7 as the user information (the vehicle setting values). In addition, in a case of a 2019 vehicle model "B", the input device 111 may be configured to receive the volume of a level 30 and the screen brightness of a level 13 as the user information (e.g., the vehicle setting values).

The vehicle setting value may be linked with the attribute information. The attribute information may include the vehicle setting functions, and the key ID matched to each vehicle setting function. The vehicle setting function may indicate within which range an electronic device inside a vehicle is controlled, which may be set differently based on vehicle models. As an example, in the case of the 2018 vehicle model "A", the vehicle setting functions may include a function of adjusting the volume in a range from a level 0 to a level 15 and a function of adjusting the screen brightness in a range from a level 0 to a level 15. In addition, in the case of the 2019 vehicle model "B", the vehicle setting functions may include a function of adjusting the volume in a range from the level 0 to a level 45, and a function of adjusting the screen brightness in a range from the level 0 to a level 20.

The key ID may be distinguished and matched for each vehicle setting function, and a different value may be assigned for each vehicle model. For example, in the case of the 2018 vehicle model "A", a key ID may be assigned as 0X1 to the vehicle volume setting function, and a key ID may be assigned as 0X2 to the vehicle screen brightness setting function. In addition, in the case of the 2019 vehicle model "B", a key ID may be assigned as 0X3 to the vehicle volume setting function, and a key ID may be assigned as 0X4 to the vehicle screen brightness setting function.

The communication device 112 may be configured to transmit the user information for each user input to the input device 111 to the server 130. For example, the communication device 112 may be configured to communicate with the server 130 in various wireless communication schemes such as a Wi-Fi, a WiBro, a global system for mobile communication (GSM), a code division multiple access (CDMA), a wideband code division multiple access (WCDMA), an universal mobile telecommunication system (UITS), a time division multiple access (TDMA), a long term evolution (LTE), and the like.

The controller 113 may be implemented by various processing devices such as a microprocessor or the like having an embedded semiconductor chip or the like capable of performing an operation or an execution of various commands, and may be configured to operate the portable device according to an exemplary embodiment of the present disclosure. The controller 113 may be configured to transmit the user information input to the input device 111 to the server 130, and when the transmitted user information is recognized by the server 130, receive the recognized information and may be configured to provide the user with the recognized information. In addition, when the user information is changed, the controller 113 may be configured to retransmit the changed information to the server 130.

FIG. 3 is a diagram illustrating a configuration of a vehicle terminal according to an exemplary embodiment of the present disclosure. As shown in FIG. 3, the vehicle terminal 120 according to an exemplary embodiment of the present disclosure may include an input device 121, a communication device 122, and a controller 123.

The input device 121 may be configured to receive the input signal corresponding to the manipulation, the operation, or the voice of the user. According to an exemplary embodiment, the input device 121 may be configured to receive the user information for each of at least one user. The user information may include the vehicle setting values input to control the vehicle model selected by the user. The vehicle setting value input by the user may be linked with the attribute information including the vehicle setting functions (e.g., the electronic device information and the settable range), the key ID for each vehicle setting function, and the like.

As an example, in the case of the 2018 vehicle model "A", the input device 121 may be configured to receive the volume of the level 10 and the screen brightness of the level 7 as the user information (the vehicle setting values). In addition, in the case of the 2019 vehicle model "B", the input device 121 may be configured to receive the volume of the level 30 and the screen brightness of the level 13 as the user information (the vehicle setting values).

The vehicle setting values may be linked with the attribute information. The attribute information may include the vehicle setting functions, and the key ID matched to each vehicle setting function. The vehicle setting function may indicate within which range the electronic device inside the vehicle is controlled, which may be set differently based on the vehicle models. As an example, in the case of the 2018 vehicle model "A", the vehicle setting functions may include the function of adjusting the volume in the range from the level 0 to the level 15 and the function of adjusting the screen brightness in the range from the level 0 to the level 15. In addition, in the case of the 2019 vehicle model "B", the vehicle setting functions may include the function of adjusting the volume in the range from the level 0 to the level 45, and the function of adjusting the screen brightness in the range from the level 0 to the level 20.

The key ID may be distinguished and matched for each vehicle setting function, and the different value may be assigned for each vehicle model. For example, in the case of the 2018 vehicle model "A", the key ID may be assigned as 0X1 to the vehicle volume setting function, and the key ID may be assigned as 0X2 to the vehicle screen brightness setting function. In addition, in the case of the 2019 vehicle model "B", the key ID may be assigned as 0X3 to the vehicle volume setting function, and the key ID may be assigned as 0X4 to the vehicle screen brightness setting function.

The communication device 122 may be configured to transmit the user information for each user input to the input device 121 to the server 130. For example, the communication device 122 may be configured to communicate with the server 130 in the various wireless communication schemes such as the Wi-Fi, the WiBro, the global system for mobile communication (GSM), the code division multiple access (CDMA), the wideband code division multiple access (WCDMA), the universal mobile telecommunication system (UITS), the time division multiple access (TDMA), the long term evolution (LTE), and the like. The controller 123 may be implemented by various processing devices such as a microprocessor or the like having an embedded semiconductor chip or the like capable of performing the operation or the execution of the various commands, and may be configured to operate the portable device according to an exemplary embodiment of the present disclosure.

The controller 123 may be configured to transmit the user information input to the input device 121 to the server 130. When the user information is recognized by the server 130, the controller 123 may be configured to receive the recognized information and provide the recognized information to the user. In addition, the controller 123 may be configured to automatically set the vehicle based on the information received from the server 130. For example, when receiving the user information in which the volume of the level 10 is input and the screen brightness of the level 7 is input from the user in the case of the 2018 vehicle model "A", the server 130 may be configured to automatically set the volume to the level 10 and automatically set the screen brightness to the level 7 without a separate manipulation of the user when the user boards the 2018 vehicle model "A".

FIG. 4 is a diagram illustrating a configuration of a server according to an exemplary embodiment of the present disclosure. As shown in FIG. 4, the server 130 according to an exemplary embodiment of the present disclosure may include a communication device 131 and a controller 133.

The communication device 131 may be configured to receive the user information for each user from the one or more of the portable device 110 and the vehicle terminal 120. The communication device 131 may be configured to communicate with the one or more of the portable device 110 and the vehicle terminal 120 in the various wireless communication schemes such as the Wi-Fi, the WiBro, the global system for mobile communication (GSM), the code division multiple access (CDMA), the wideband code division multiple access (WCDMA), the universal mobile telecommunication system (UMTS), the time division multiple access (TDMA), the long term evolution (LTE), and the like.

The storage 132 may be configured to store the user information of each user received from the portable device 110 and the vehicle terminal 120. In addition, the storage 132 may be configured to store at least one or more algorithm that performs the operation or the execution of the various commands for the operation of the server 130. The storage 132 may include at least one storage medium of a flash memory, a hard disc, a memory card, a read-only memory (ROM), a random access memory (RAM), an electrically erasable programmable read-Only memory (EEPROM), a programmable read-only memory (PROM), a magnetic memory, a magnetic disk, and/or an optical disk.

The controller 133 may be implemented by various processing devices such as a microprocessor or the like having an embedded semiconductor chip or the like capable of performing the operation or the execution of the various commands, and may be configured to operate the vehicle control device according to an exemplary embodiment of the present disclosure. The controller 133 may be configured to receive the user information from the one or more of the portable device 110 and the vehicle terminal 120, and may be configured to determine whether the received user information is recognizable based on the user information stored in the storage 132 in advance. A more detailed description will be given with reference to FIGS. 5 and 6.

Figure 5:
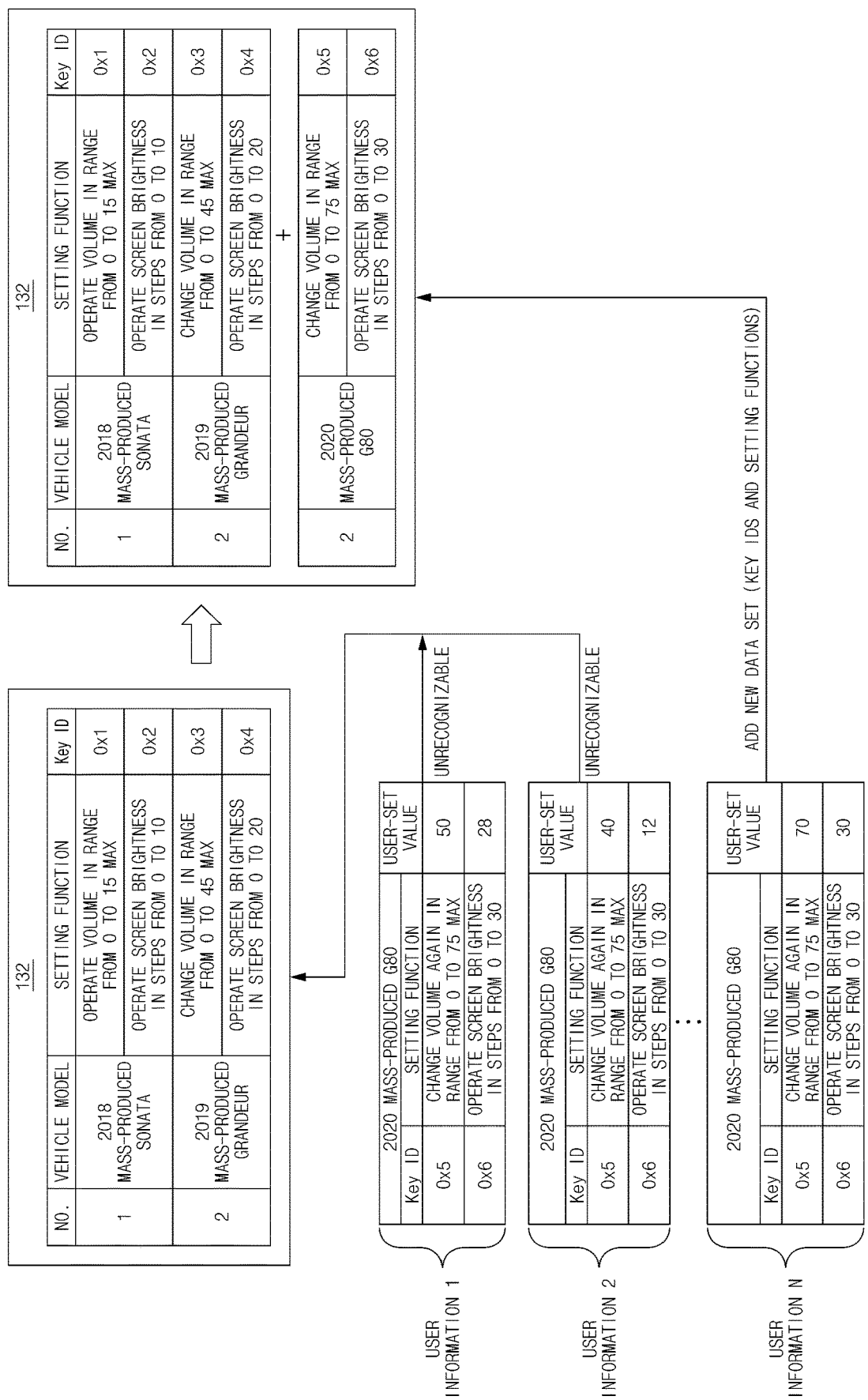
FIGS. 5 and 6 are diagrams schematically illustrating operations of a connected service providing system according to an exemplary embodiment of the present disclosure.
Figure 6:
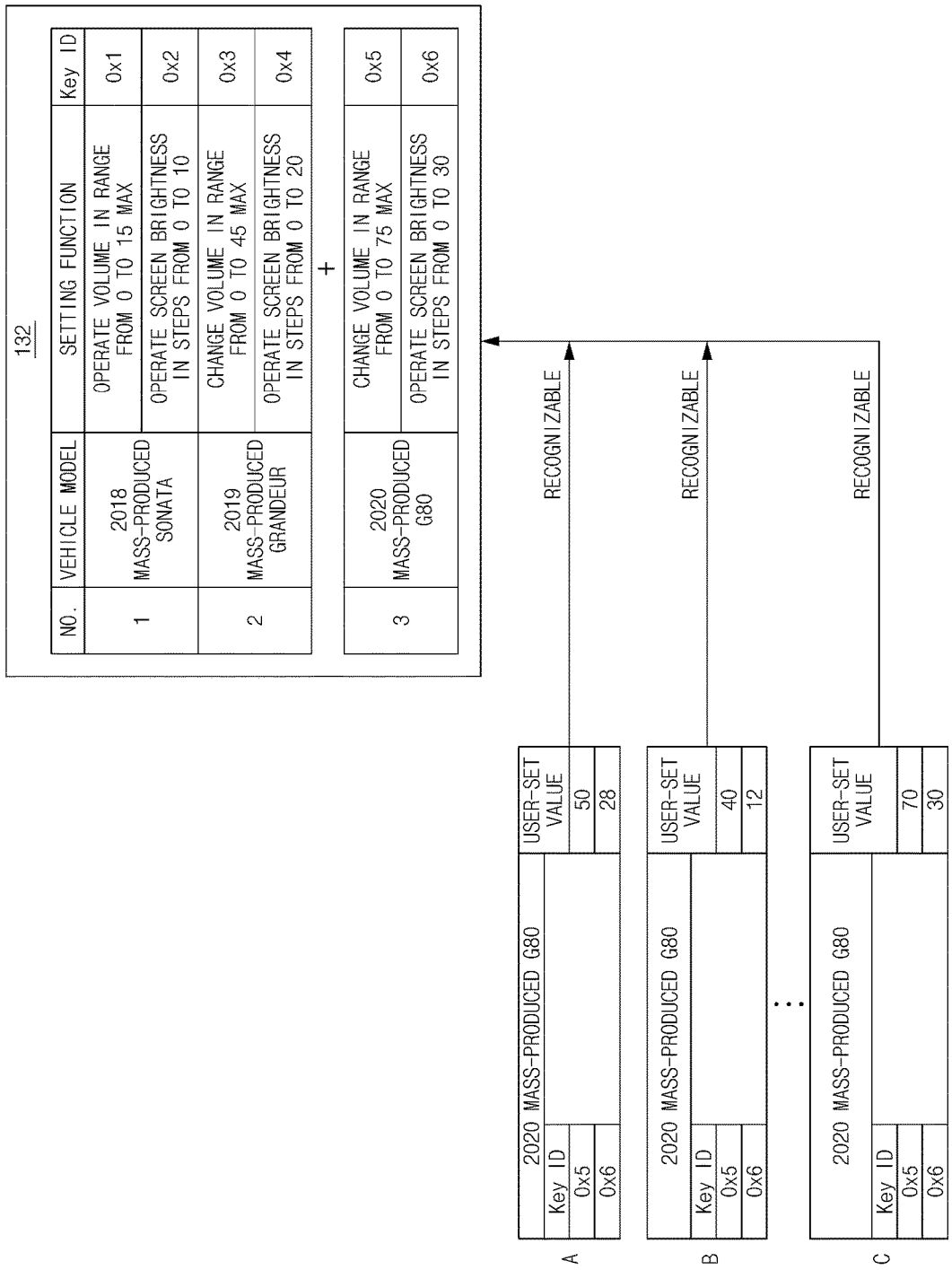

FIGS. 5 and 6 are diagrams schematically illustrating operations of a connected service providing system according to an exemplary embodiment of the present disclosure. As shown in FIG. 5, the controller 133 receives user information 1 from one or more of the portable device 110 and the vehicle terminal 120, and determines whether the user information 1 is recognizable based on the user information stored in the storage 132 in advance. Since only the key IDs from 0X1 to 0X4 exist, and 0X5 and 0X6 do not exist in the user information stored in advance, the controller 133 may be configured to determine that the received user information 1 is unrecognizable.

Thereafter, the controller 133 may be configured to receive user information 2, and determine whether the user information 2 is recognizable again based on the user information stored in the storage 132 in advance. In addition, since only the key IDs from 0X1 to 0X4 exist, and 0X5 and 0X6 do not exist in the user information stored in advance, the controller 133 may be configured to determine that the received user information 2 is unrecognizable. The controller 133 may be configured to determine whether the number of times the unrecognizable user information is received exceeds a predetermined number of times (e.g., n−1). For example, when user information n is received from one or more of the portable device 110 and the vehicle terminal 120, and it is determined that the user information n is not recognized, the controller 133 may be configured to determine that the unrecognizable user information is received the number of times exceeding the predetermined number of times n−1.

In response to determining that the number of times the unrecognizable user information is received exceeds the predetermined number of times, the controller 133 may be configured to determine the unrecognizable user information as the new data set, and may additionally store the unrecognizable user information in the storage 132. In this connection, the unrecognizable user information may include the vehicle setting values and the attribute information respectively linked with the vehicle setting values. According to an exemplary embodiment, the vehicle setting values may be a volume level 70 and a screen brightness level 30, and the attribute information linked with the vehicle setting value may include the vehicle setting functions (e.g., a function of adjusting the volume in a range from the level 0 to a level 75 and a function of adjusting the screen brightness in the range from the level 0 to the level 30) and the key IDs 0X5 and 0X6 respectively matched with the vehicle setting functions.

In addition, the controller 133 may be configured to inform the one or more of the portable device 110 and the vehicle terminal 120 that the new data set is stored in the storage 132. After the new data set is stored, even when only the vehicle setting values are received from the one or more of the portable device 110 and the vehicle terminal 120, the controller 133 may be configured to recognize the vehicle setting values based on the information stored in the storage 132. FIG. 6 will be referred to for a more detailed description.

As shown in FIG. 6, after the new data is stored in the storage 132, when vehicle setting values A, B, and C input by the user are received from one or more of the portable device 110 and the vehicle terminal 120, the vehicle setting values may be recognized based on key IDs respectively linked with the vehicle setting values. Even when vehicle setting functions respectively matched with the key IDs are not received from the one or more of the portable device 110 and the vehicle terminal 120, since the vehicle setting functions respectively matched with the key IDs are stored in the storage 132, the controller 133 may be configured to recognize the vehicle setting values by linking the received vehicle setting values respectively with the vehicle setting functions.

Figure 7:
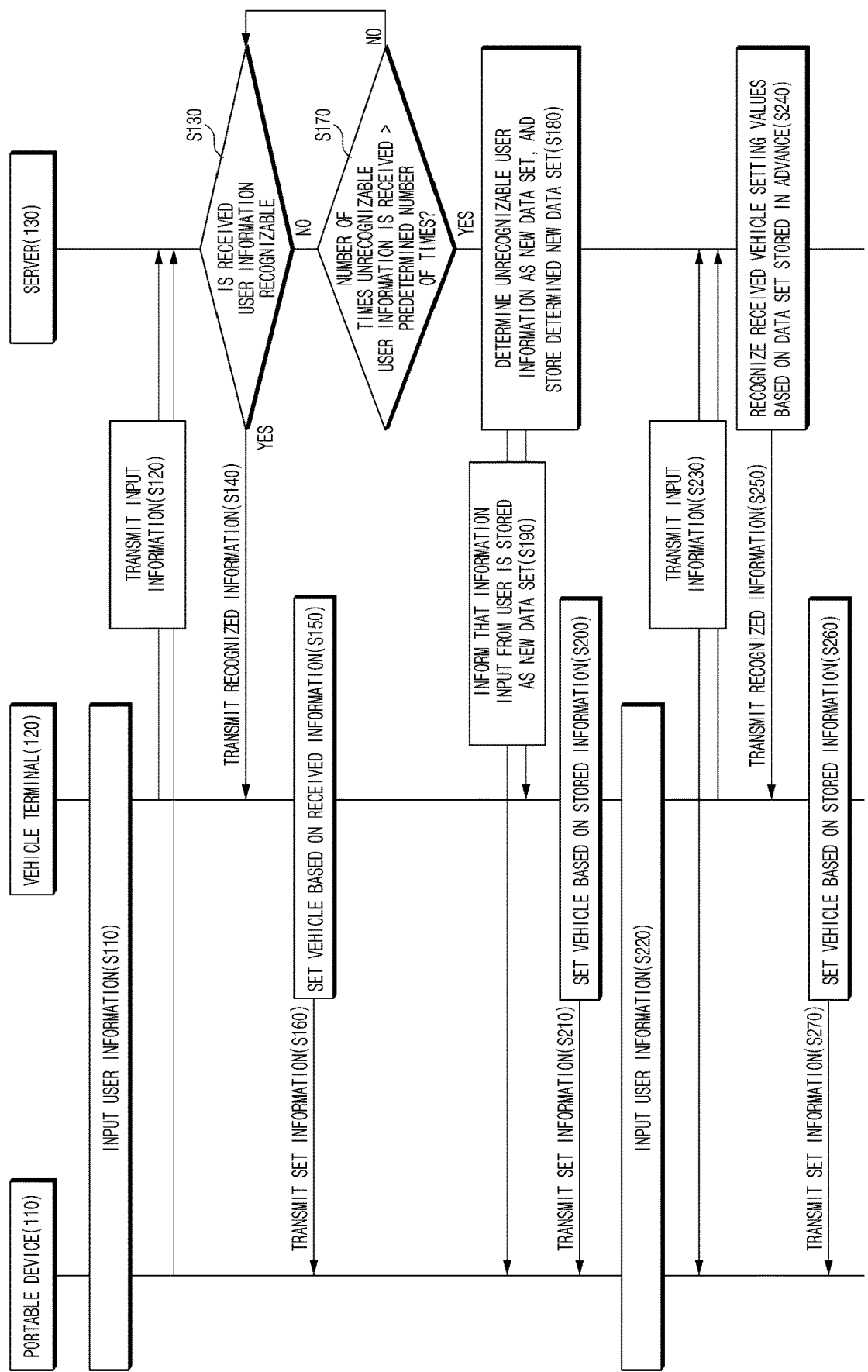
FIG. 7 is a flowchart illustrating a connected service providing method according to an exemplary embodiment of the present disclosure.

FIG. 7 is a flowchart illustrating a connected service providing method according to an exemplary embodiment of the present disclosure. As shown in FIG. 7, the one or more of the portable device 110 and the vehicle terminal 120 may be configured to receive the user information (S110). The user information input in S110 may include the vehicle setting values input to control the vehicle model selected by the user. The vehicle setting values input by the user may be linked with the attribute information including the vehicle setting functions (e.g., the electronic device information and the settable range), the key ID for each vehicle setting function, and the like.

The one or more of the portable device 110 and the vehicle terminal 120 may be configured to transmit the input information to the server 130 (S120). The server 130 may be configured to determine whether the received user information is recognizable based on the information stored in advance (S130). In response to determining in S130 that the user information received is recognizable (Y), the server 130 may be configured to transmit the recognized information to the vehicle terminal 120 (S140), and the vehicle terminal 120 may be configured to automatically set the vehicle based on the received information (S150). In addition, the vehicle terminal 120 may be configured to transmit the information set on the vehicle to the portable device 110 (S160), so that the user may more easily read the vehicle setting information.

In response to determining in S130 that the received user information is unrecognizable (N), the server 130 may be configured to determine whether the number of times the unrecognizable user information is received exceeds the predetermined number of times (S170). In response to determining in S170 that the number of times the unrecognizable user information is received exceeds the predetermined number of times (Y), the server 130 may be configured to determine the unrecognizable user information as the new data set, and store the new data set in the storage (S180). On the other hand, when the number of times the unrecognizable user information is received does not exceed the predetermined number of times in S170, S130 is performed.

When the new data set is stored, the server 130 may be configured to inform the one or more of the portable device 110 and the vehicle terminal 120 that the user information is stored as the new data set (S190). When it is identified from the server 130 that the new data set is stored, the vehicle terminal 120 may be configured to automatically set the vehicle based on the new data set stored in the server 130 (S200). In addition, the vehicle terminal 120 may be configured to transmit the information set on the vehicle to the portable device 110 (S210), and thus, the user may more easily read the vehicle setting information.

The one or more of the portable device 110 and the vehicle terminal 120 may be configured to receive the user information after the new data set is stored in the server 130 (S220). The user information input in S220 may include the vehicle setting values input to control the vehicle model selected by the user. The vehicle setting values input by the user may be linked with the attribute information including only the key IDs.

The one or more of the portable device 110 and the vehicle terminal 120 may be configured to transmit the input information to the server 130 (S230). The server 130 may be configured to recognize the vehicle setting values received in S230 based on the information including the new data set stored in advance (S240). In S240, the server 130 may be configured to recognize the vehicle setting values based on the key IDs respectively linked with the vehicle setting values. Even when the vehicle setting functions respectively matched with the key IDs are not received from the one or more of the portable device 110 and the vehicle terminal 120, since the vehicle setting functions respectively matched with the key IDs are stored in the storage 132, the server 130 may be configured to recognize the vehicle setting values by linking the received vehicle setting values respectively with the vehicle setting functions.

The server 130 may be configured to transmit the recognized user information (e.g., the vehicle setting values) to the vehicle terminal 120 (S250). In response to determining in S130 that the received user information is recognizable (Y), the server 130 may be configured to transmit the recognized information to the vehicle terminal 120 (S250), and the vehicle terminal 120 may be configured to automatically set the vehicle based on the received information (S260). In addition, the vehicle terminal 120 may be configured to transmit the information set on the vehicle to the portable device 110 (S270), and thus, the user may more easily read the vehicle setting information.

Figure 8:
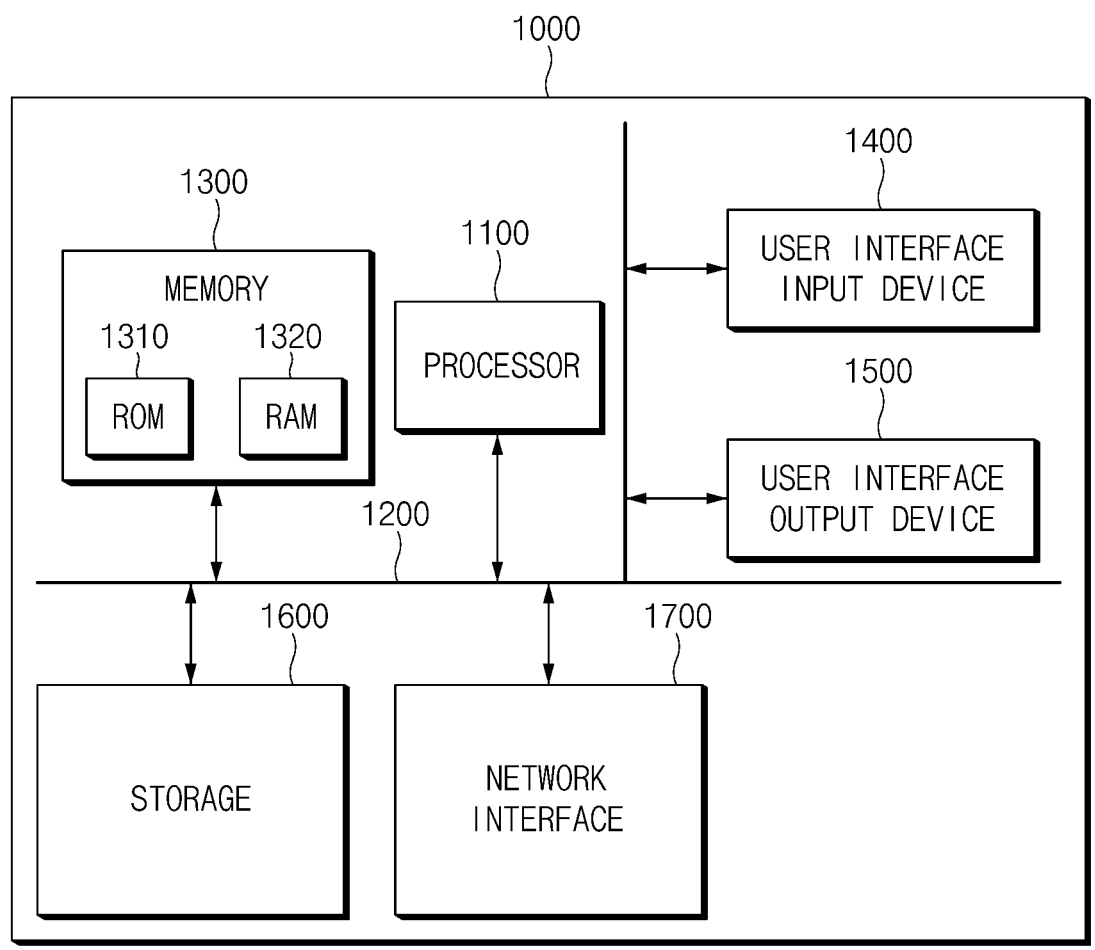
FIG. 8 illustrates a configuration of a computing system in which a method according to an exemplary embodiment of the present disclosure is implemented.

FIG. 8 illustrates a configuration of a computing system in which a method according to an exemplary embodiment of the present disclosure is implemented. With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments disclosed in the present disclosure are not intended to limit the technical idea of the present disclosure but to illustrate the present disclosure, and the scope of the technical idea of the present disclosure is not limited by the exemplary embodiments. The scope of the present disclosure should be construed as being covered by the scope of the appended claims, and all technical ideas falling within the scope of the claims should be construed as being included in the scope of the present disclosure.

The system and the method for providing the connected service according to an exemplary embodiment of the present disclosure reduce inconvenience because the data set including the attributes of the setting functions is not updated every time for the new vehicle model, and allow the user to conveniently use the connected service when necessary because an occurrence of an error during an update process is fundamentally prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for providing a connected service, comprising:
   a portable device and a vehicle terminal, each including a processor, wherein first user information and second user ion are input into the portable device and the vehicle terminal; and
   a server including a processor and configured to:
   receive the first user information from one or more of the portable device and the terminal and determine whether the received first user information is recognizable; and
   determine whether to store the first user information as a new data set based on the number of times the first user information is received in response to determining that the first user information is unrecognizable,
   wherein the first user information includes vehicle setting values and attribute information linked to the vehicle setting values,
   wherein the attribute information includes vehicle setting functions and key IDs respectively matched to the vehicle setting functions,
   wherein the server informs the one or more of the portable device and the vehicle terminal that the new data set is stored when the first user information is stored as the new data set;
   wherein the vehicle setting functions include a function of controlling an electronic device in a vehicle within predetermined range;
   wherein the vehicle terminal is configured to automatically set the vehicle based on the new data set stored in the server when it is received from the server that the new data set is stored, and allow a user to use information automatically set on the vehicle without any additional input;
   wherein the portable device and the vehicle terminal are further configured to transmit the second user information to the sever after being informed that the new data set is stored in the server; and
   wherein the second user information includes vehicle setting value linked attribute information that only includes the Key IDs.

2. The system of claim 1, wherein the server is configured to determine whether the number of times unrecognizable first user information is received exceeds a predetermined number of times in response to determining that the received first user information is unrecognizable.

3. The system of claim 2, wherein the server is configured to determine to store the first user information as the new data set in response to determining that the number of times the unrecognizable first user information is received exceeds the predetermined number of times.

4. The system of claim 1, wherein the server is configured to recognize the second user information received from the one or more of the portable device and the vehicle terminal based on the information stored in the server.

5. The system of claim 4, wherein the vehicle terminal is configured to receive vehicle setting values recognized from the server, and set a vehicle with the received vehicle setting values.

6. A method for providing a connected service, comprising:
   receiving, by a controller including a processor, first user information from one or more of a portable device and a vehicle terminal;
   receiving, by a server including a processor, the first user information from the one or more of the portable device and the terminal, and determining whether the received first user information is recognizable; and
   determining, by the controller, whether to store the first user information as a new data set based on the number of times the user information is received in response to determining that the user information is unrecognizable,
   wherein the first user information includes vehicle setting values and attribute information linked to the vehicle setting values,
   wherein the attribute information includes vehicle setting functions and key IDs respectively matched to the vehicle setting functions,
   wherein the server informs the one or more of the portable device and the vehicle terminal that the new data set is stored when the first user information is stored as the new data set;
   wherein the vehicle setting functions include a function of controlling an electronic device in a vehicle within predetermined range; and
   wherein the vehicle terminal is configured to automatically set the vehicle based on the new data set stored in the server when it is received from the server that the new data set is stored, and allow a user to use information automatically set on the vehicle without any additional input;
   wherein the portable device and the vehicle terminal are configured to transmit second user information to the server after being informed that the new data set is stored in the server; and
   wherein the second user information includes vehicle setting value linked attribute information that only includes the Key IDs.

7. The method of claim 6, further comprising:
   determining whether the number of times unrecognizable first user information is received exceeds a predetermined number of times in response to determining that the received first user information is unrecognizable.

8. The method of claim 7, further comprising:
determining to store the first user information as the new data set in response to determining that the number of times the unrecognizable first user information is received exceeds the predetermined number of times.

9. The method of claim 6, further comprising:
recognizing the second user information received from the one or more of the portable device and the vehicle terminal based on the information stored in the server.

10. The method of claim 9, further comprising:
receiving, by the vehicle terminal, vehicle setting values recognized from the server, and setting a vehicle with the received vehicle setting values.

\* \* \* \* \*